United States Patent
Bellorado et al.

(10) Patent No.: US 8,249,197 B2
(45) Date of Patent: Aug. 21, 2012

(54) DECISION DIRECTED TIMING RECOVERY USING MULTI-PHASE DETECTION

(75) Inventors: Jason Bellorado, Santa Clara, CA (US); Marcus Marrow, Santa Clara, CA (US)

(73) Assignee: Link_A_Media Devices Corporation, Santa Clara, CA (US)

( * ) Notice: Subject to any disclaimer, the term of this patent is extended or adjusted under 35 U.S.C. 154(b) by 0 days.

(21) Appl. No.: 13/314,549

(22) Filed: Dec. 8, 2011

(65) Prior Publication Data

US 2012/0076196 A1    Mar. 29, 2012

Related U.S. Application Data

(63) Continuation of application No. 12/069,173, filed on Feb. 6, 2008, now Pat. No. 8,121,219.

(51) Int. Cl.
    *H03K 9/00*    (2006.01)
(52) U.S. Cl. ......................................................... 375/316
(58) Field of Classification Search .................. 375/316, 375/324, 325, 326, 327, 328, 354, 355, 373, 375/376
    See application file for complete search history.

(56) References Cited

U.S. PATENT DOCUMENTS

| | | | |
|---|---|---|---|
| 6,211,741 B1 * | 4/2001 | Dalmia | 331/11 |
| 6,266,799 B1 * | 7/2001 | Lee et al. | 716/113 |
| 6,307,884 B1 * | 10/2001 | Du et al. | 375/233 |
| 6,560,306 B1 * | 5/2003 | Duffy et al. | 375/376 |
| 6,788,749 B2 * | 9/2004 | Voorman et al. | 375/340 |
| 6,914,953 B2 * | 7/2005 | Boerstler | 375/373 |
| 2001/0043658 A1 * | 11/2001 | Voorman et al. | 375/340 |
| 2002/0080516 A1 * | 6/2002 | Bhakta et al. | 360/77.02 |
| 2004/0057268 A1 * | 3/2004 | Kanaoka et al. | 365/45 |
| 2004/0101068 A1 * | 5/2004 | Wang et al. | 375/324 |
| 2006/0083339 A1 * | 4/2006 | Aziz et al. | 375/355 |
| 2006/0193194 A1 * | 8/2006 | Schnell | 365/233 |
| 2007/0047686 A1 * | 3/2007 | Aoki et al. | 375/374 |
| 2008/0276156 A1 | 11/2008 | Gunnam et al. | |
| 2008/0301521 A1 | 12/2008 | Gunnam et al. | |
| 2009/0041170 A1 * | 2/2009 | Chang et al. | 375/355 |

* cited by examiner

*Primary Examiner* — Jaison Joseph
(74) *Attorney, Agent, or Firm* — Van Pelt, Yi & James LLP

(57) ABSTRACT

A set of one or more samples is received. Using a first signal processor associated with a first phase offset, a first decision and a first error value are generated using the set of samples. Using a second signal processor associated with a second phase offset, a second decision and a second error value are generated using the set of samples. This includes interpolating the set of samples to obtain a set of interpolated samples at the second phase offset and generating the second decision and the second error value using the set of interpolated samples at the second phase offset. A selection associated with the first decision and the second decision is made based at least in part on the first error value and the second error value.

21 Claims, 5 Drawing Sheets

DECISION DIRECTED TIMING RECOVERY USING MULTI-PHASE DETECTION

CROSS REFERENCE TO OTHER APPLICATIONS

This application is a continuation of co-pending U.S. patent application Ser. No. 12/069,173 entitled DECISION DIRECTED TIMING RECOVERY USING MULTI-PHASE DETECTION filed Feb. 6, 2008 which is incorporated herein by reference for all purposes.

BACKGROUND OF THE INVENTION

When reading data stored in a disk drive system, the stored data is sampled and then processed, for example using one or more error correction codes. The performance of a disk drive system (or any sampled data system for that matter) depends upon the ability to sample an input signal at or near the phase at which the system was designed to operate (i.e., an ideal or perfect sampling phase). A typical approach to ensuring such timing accuracy is to use decisions (an estimate of the transmitted/written signal) produced by a low latency detector to construct a timing error gradient. This gradient is then used as input to a feedback loop (e.g., a timing loop) which drives the sampling phase to its proper value.

This approach works when the quality of the decisions made by the low latency detector is sufficiently accurate (i.e., has a sufficient signal to noise ratio (SNR)). In poor conditions (e.g., low SNR), systems that use this approach fail. In a worst case scenario, the system loses lock where the sampling phase is completely unknown and the transmitted/written data becomes unrecoverable. The trend in disk drive systems is towards lower SNR, for example because of increased storage capacity as would be achievable with more powerful codes (e.g., low density parity check (LDPC) codes). In current disk drive systems it is not uncommon to observe phase offsets of ±15% (where a phase offset of ±50% corresponds to being 180° out of phase with respect to an ideal sampling phase); future systems may have phase offsets of ±25% or more. It would be desirable to develop new techniques and systems to handle lower SNR values. Furthermore, it would be desirable if at least some of these techniques and systems take into account considerations such as die size (which affects cost), power consumption, latency, etc.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In a single detector decision-directed timing-loop structure, decisions are produced by a single, low-latency detector. The single detector takes as input the sampled waveform and outputs an estimate of the transmitted/written data. The detector in this single detector approach is designed to operate at a particular sampling phase. In general, as the sampling phase moves increasingly away from the phase at which the detector was designed to operate, the reliability of its decisions is monotonically reduced. What is disclosed is a technique in which multiple detectors are used. Each detector is associated with and/or configured to operate at a particular phase offset, for example expressed as a percentage of a sampling interval (T). The outputs of the detectors are then selected from and the selected output is further processed as needed.

Figure 1:
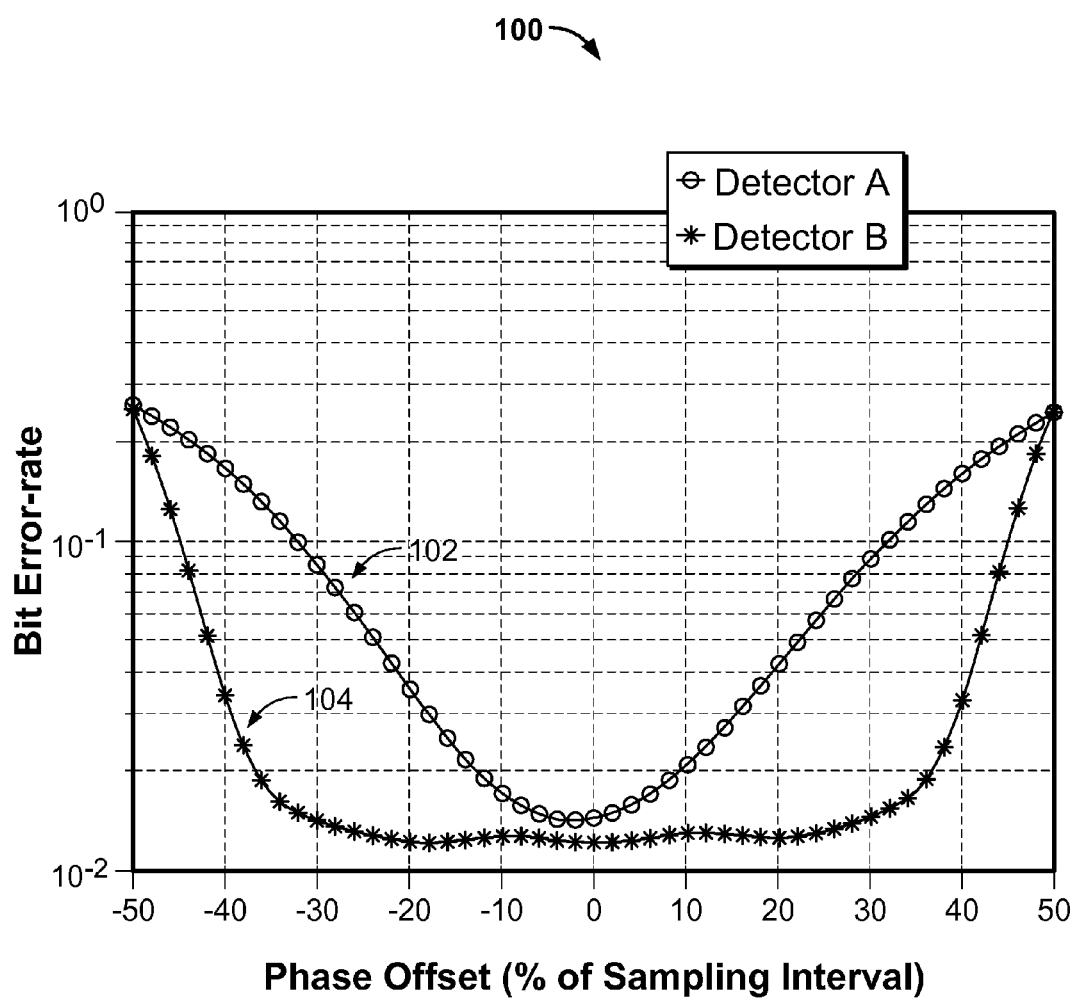
FIG. 1 is a graph comparing bit error rates using a single detector approach and an embodiment with three detectors.

FIG. 1 is a graph comparing bit error rates using a single detector approach and an embodiment with three detectors. In graph 100, line 102 corresponds to a single detector approach in which a single detector is used. So long as the sampling phase is within ≈10% of the expected sampling phase (i.e., a phase offset of 0%), there is little degradation in the bit error rate (BER). For larger magnitude phase offsets, the degradation is rapid and severe. Although some examples described herein use a percentage to quantify a phase offset, it is understood that a phase offset can be quantified using other units.

Line 104 corresponds to an embodiment in which there are three detectors (not shown). One detector operates at 0% phase offset, the second at +20% phase offset, and the third at −20% phase offset. Line 204 has a local minimum at each of the three phase offsets. As graph 100 shows, using multiple detectors increases the range of phase offsets over which the BER is low. Line 104 remains roughly at a constant and low BER from approximately −30% to +30% phase offset.

Figure 2:
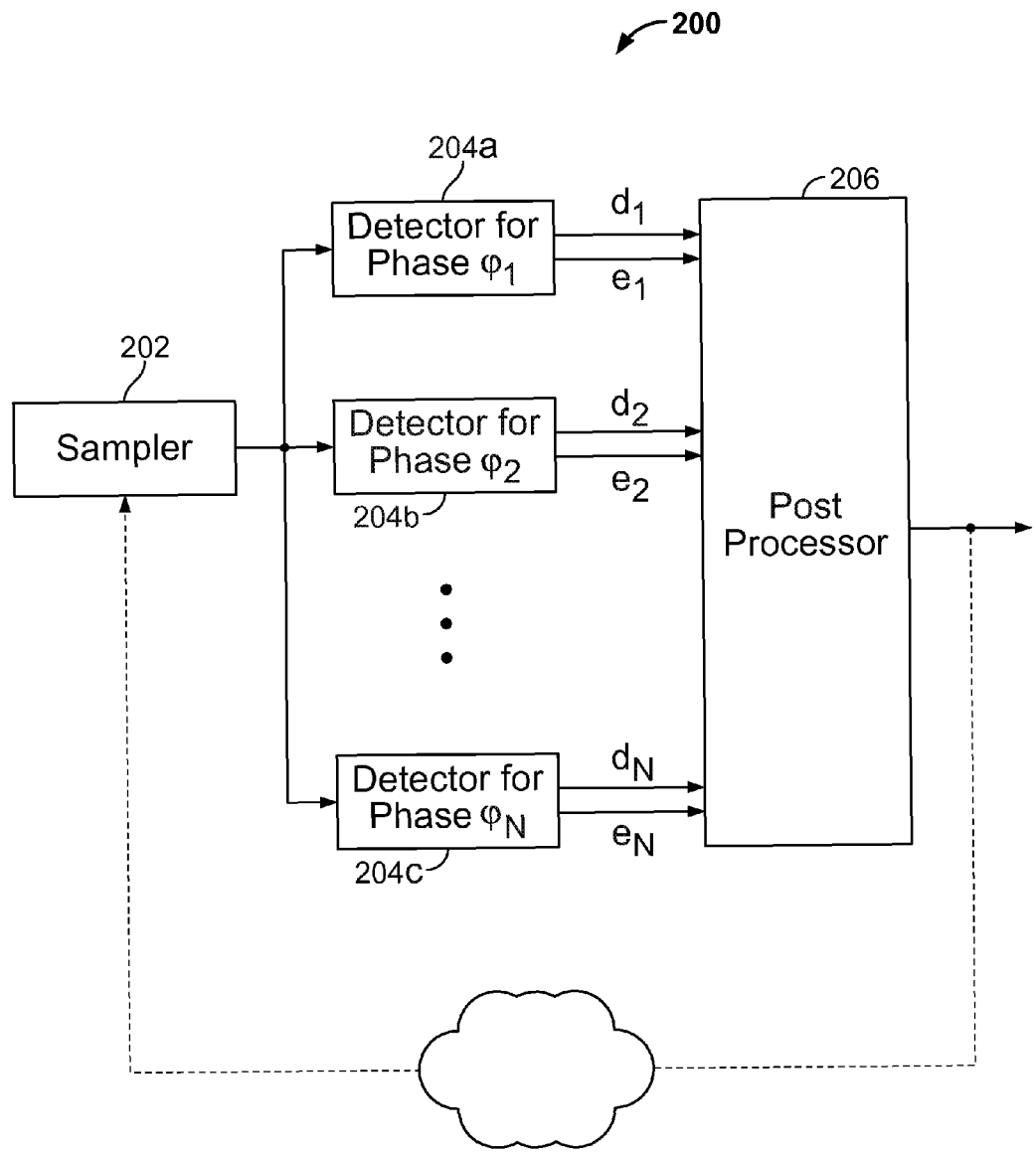
FIG. 2 is a block diagram illustrating an embodiment with N detectors.

FIG. 2 is a block diagram illustrating an embodiment with N detectors. In the example shown, sampler 202 periodically outputs a sample every T units of time to detectors 204a-204c. In some embodiments, sampler 202 includes an analog to digital converter (ADC). Ideally, sampler 202 operates with 0% phase offset from an ideal or expected sampling time or point. In non-ideal cases, sampler 202 operates with some non-zero phase offset, for example because of imperfect acquisition.

In the embodiment shown, system 200 has a parallel bank of N detectors (204a-204c). Each detector is configured to operate at or otherwise process samples at a particular sampling phase. For example, detector 204a is configured to operate at sampling phase φ1, detector 204b is configured to operate at sampling phase φ2, etc. Using detectors 204a-204c improves the performance of system 200 compared to single detector systems with a single detector. For example, suppose N=3 and detectors 204a-204c are configured to operate at −20%, 0%, and +20% phase offsets, respectively. If sampler 202 is operating at a +20% phase offset, the decisions made by detector 204c will make highly reliable decisions with little or no error. Even if sampler 202 operates at a phase offset that is not exactly equal to any of the phase offsets associated with detectors 204a-204c, the performance will be better than that of a single detector. Going back to FIG. 1, for example, line 102 corresponds to a detection scheme which utilizes a single detector designed to operate at a phase offset of 0%. Line 104, corresponding to detector b, uses three detectors configured for phase offsets of −20%, 0%, and 20%. With the proposed architecture, the bit error rate is almost completely insensitive to phase offsets extending from −35% to 35%, a drastic improvement over the single detector case. This results in better timing accuracy of the overall system as well as a drastic reduction in the likelihood that a timing loop will lose lock.

In the embodiment of FIG. 2, detectors 204a-204c have as input the same samples output by sampler 202. In some embodiments, detectors 204a-204c perform interpolation (if needed) upon the common samples depending upon its particular phase, φi. In some embodiments, interpolation is performed using a finite impulse response (FIR) filter. For example, if φ2=0% then detector 204b in such embodiments would perform no interpolation. If φ1=−20% then detector 204a would perform an interpolation on the common sample inputs to obtain samples corresponding to a −20% phase offset. Other embodiments may be configured differently. For example, in some other embodiments there are multiple samplers that operate at different phases and the samples from each are passed to the corresponding detector.

In various embodiments, various numbers of detectors (N) are used. Considerations such as a tradeoff between performance and (die) size may be considered. In some embodiments, N=3; one of the detectors operates at a 0% phase offset and the other two detectors operate at ±φ(e.g., ±20%).

The output of detectors 204a-204c may include, but are not limited to, decisions and reliability information (i.e., an error) which are passed to post processor 206 in this example. In some embodiments, an error is output for or over a certain number of samples or cycles. For example, one error value is output for every eight decisions or cycles. Post processor 206 selects one of the decisions that are applied to it by detectors 204a-204c based on the errors e1, e2, . . . , and eN and outputs the selected decision as a final decision.

In various embodiments, various detectors are used. Some examples include a Dual Decision Feedback Equalizer (DDFE) and a Viterbi detector. Some types of detectors may be more desirable than others for a particular application. For example, although the output of a Viterbi detector is more reliable and less sensitive to phase offsets than a DDFE, it has a longer latency and more complex design in hardware. In applications where the additional latency, cost, and/or complexity is/are an issue, a DDFE may be preferable over a Viterbi detector. In other applications where performance is very important and cost and latency are less of an issue, a Viterbi decoder may be more attractive than a DDFE.

In some embodiments, post processor 206 is configured to select a group of consecutive decisions from one of the detectors as opposed to selecting a new decision each time. For example, post processor 206 may decide to use M consecutive decisions from the same detector. At the end of the M decisions, a new selection is made and the next M decisions come from the selected detector.

In some embodiments, post processor 206 outputs soft decisions as opposed to hard decisions. In some cases, a higher degree of accuracy can be obtained by producing a soft error (as opposed to a hard yes/no or 0/1 value) on the relevant samples which may be used by a timing loop to produce a timing error gradient.

One consideration in the design of a timing recovery system is its associated latency. Timing loops with a higher latency incur a larger degradation in accuracy since any change in the sampling phase will take longer before the appropriate correction is applied to the system. In the embodiment of FIG. 2, detectors 204a-204c are implemented in parallel and no additional latency is incurred by the replication of those detectors. Post processor 206 in the timing loop does increase the overall latency of the timing loop if implemented in series with the detectors. One embodiment which reduces the latency associated with post processor 206 in series with detectors 204a-204c is shown below.

Figure 3:
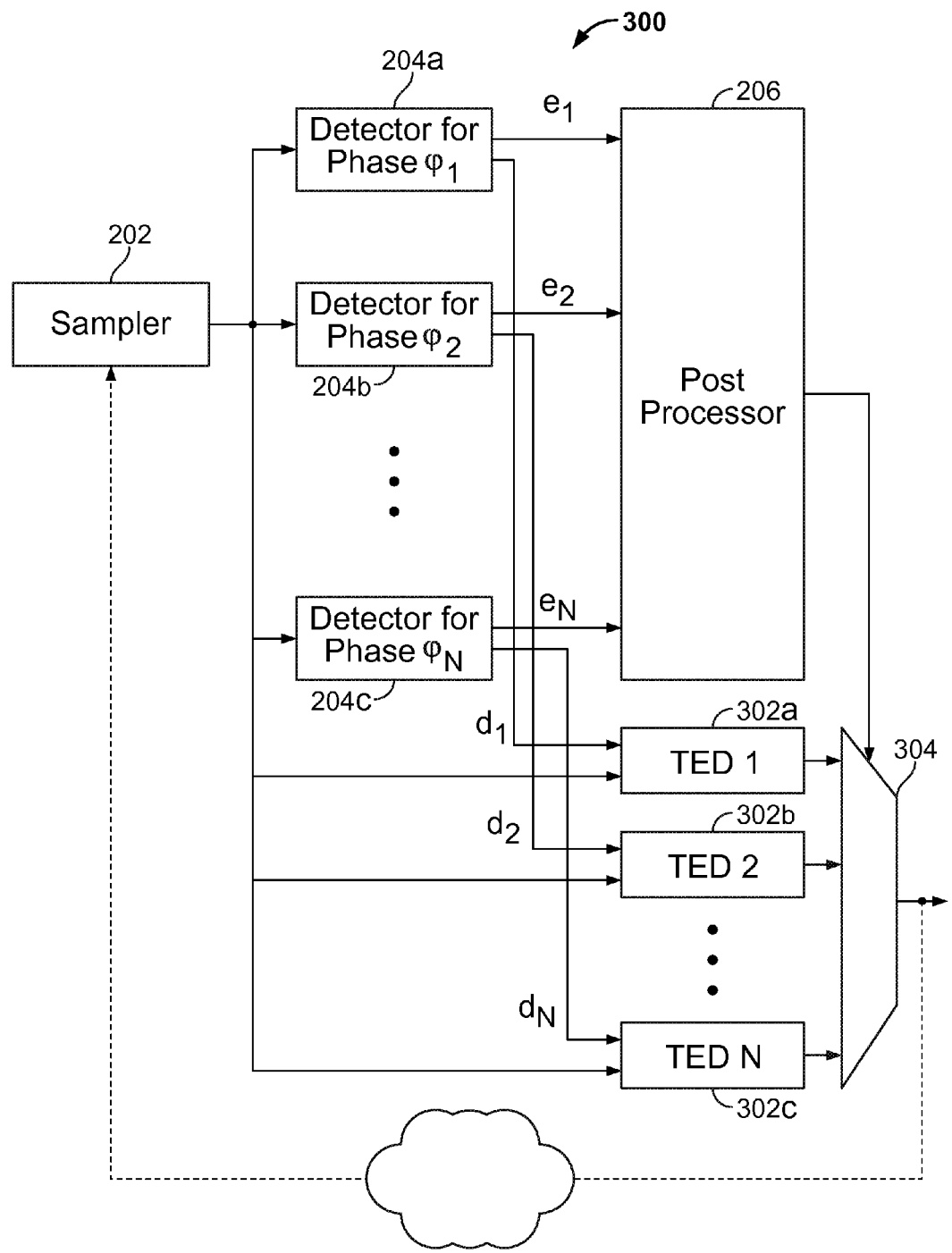
FIG. 3 is a block diagram illustrating an embodiment of a timing loop with a bank of parallel timing error detectors.

FIG. 3 is a block diagram illustrating an embodiment of a timing loop with a bank of parallel timing error detectors. In the example shown, the errors output by detectors 204a-204c are passed to post processor 206 while the decisions are passed to the respective timing error detector (TED). Each TED computes a timing error gradient based on the decisions passed to it and is part of the timing loop. Post processor 206 outputs an index m which controls multiplexer 304. Based on the index m, multiplexer 304 selects one of the outputs of TEDs 302a-302c. In this embodiment, post processor 206 and TEDs 302a-302c operate in parallel, as opposed to having a single TED (not shown) after post processor 206. In this way, post processor 206 can be included without adding latency to the timing loop since a TED is used anyway in a timing loop.

In this embodiment, an expected channel output that is closest in squared distance to a received waveform is selected as the decoded bit sequence. Detectors 204a-204c output this distance (which is a measure of the reliability of the produced decisions) and it is used by post processor 206 to select the most reliable decision provided to it. In other embodiments, selection by post processor 206 is performed based on some metric other than least squared distance.

Since the proper (i.e., correct) sampling phase is slowly varying, it is highly likely that over the course of several consecutive samples (or even several hundred consecutive samples) the detector sampling closest to the expected sampling point will not change. Some embodiments select the output associated with the detector which is most reliable over a temporal window adjacent to the considered sample. In some embodiments, a lossy integrator (e.g., with a decay dictated by a given real number a <1) is utilized. In one embodiment, the selection equation for time index k is:

$$m_k = \sum_{i=0}^{k} \alpha^i \cdot d_{k-i}^2 \quad (1)$$

where $d_j^2$ is the squared distance associated with the decision of time index j. In some embodiments, a decay value of a≈0.75 is used since it has been shown to work well empirically.

A common figure of merit used to evaluate or compare the effectiveness of a timing error detector is an s-curve. The following figure shows an s-curve for an embodiment with three DDFE detectors.

Figure 4:
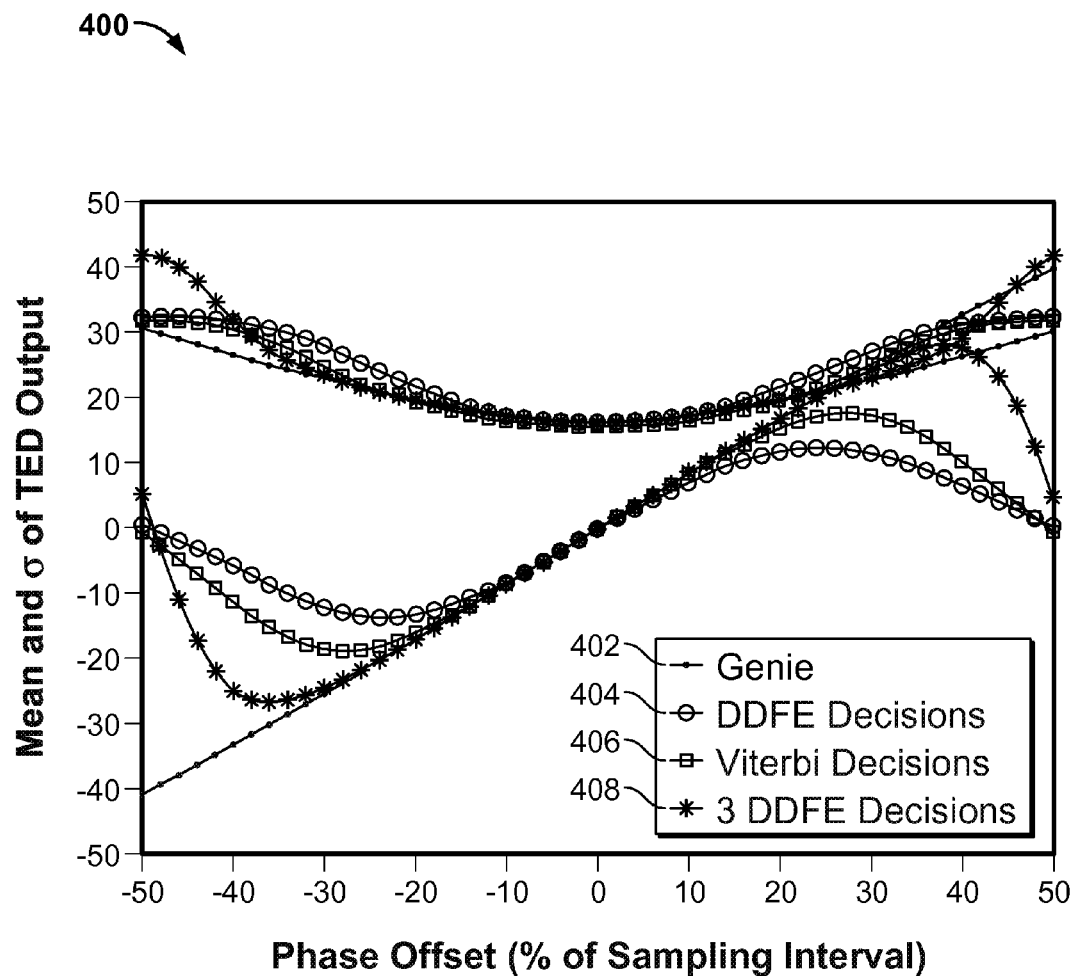
FIG. 4 is a graph showing s-curves for a TED utilizing a single DDFE, a single Viterbi detector, and an embodiment with a parallel bank of three DDFEs.

FIG. 4 is a graph showing s-curves for a TED utilizing a single DDFE, a single Viterbi detector, and an embodiment with a parallel bank of three DDFEs. In the example shown, the three DDFEs are associated with phase-offsets of −20%, 0%, and +20%, respectively. S-curves show the mean and standard deviation of the timing error gradient produced by a TED as a function of sampling phase offset. For a given phase offset, a timing error gradient with a larger mean and smaller standard deviation allows for a timing loop to pull the phase faster and more consistently towards the proper sampling phase. A system with a larger mean and smaller standard deviation for a given phase offset is therefore more desirable.

Graph 400 includes s-curve 402 associated with perfect decisions (referred to as a genie) for comparison purposes. S-curves 404, 406, and 408 are associated with a single DDFE, a Viterbi detector, and three DDFEs, respectively. As shown, the detection schemes are similar for phase offsets of less than ±10% of the sampling interval, after which the performance of the single DDFE (404) begins to degrade compared to the genie (402), Viterbi detector (406), and three DDFEs (408). The Viterbi detector performs comparably well until ±15% of the sampling interval. The 3 DDFEs extend this range to about ±30%. The parallel bank of 3 DDFEs is superior to the single DDFE and Viterbi detector scenarios for phase offsets extending to about half the sampling interval. It should be noted that the hardware design of 3 DDFEs is less complex than that of a single Viterbi detector.

Figure 5:
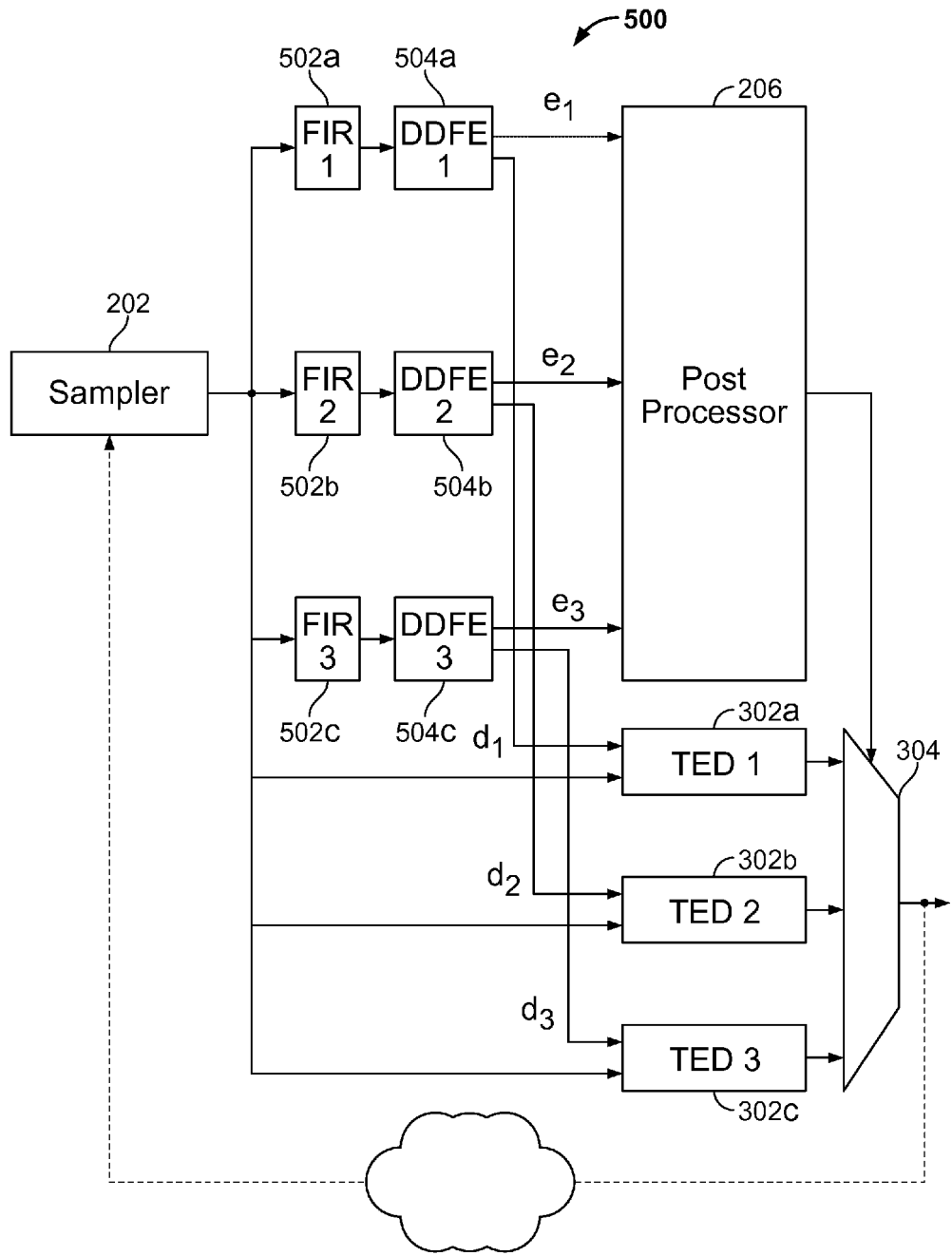
FIG. 5 is a block diagram showing an embodiment with three parallel FIR pre-filters and DDFEs.

FIG. 5 is a block diagram showing an embodiment with three parallel FIR pre-filters and DDFEs. In the example shown, FIR pre-filters 502a-502c perform the appropriate phase equalization in order for the corresponding DDFE to operate properly at the phase offset for which that particular DDFE is configured. In this example, FIR pre-filers 502a-502c are each six taps long (i.e., have six coefficients) with the third tap designated as the main tap. The six coefficients of FIR pre-filters 502a-502c are signed numbers with the scaling and range for this particular embodiment being:

| Tap | Scaling | Range |
|---|---|---|
| 0 | <<10 | −32/1024 thru 31/1024 |
| 1 | <<9 | −32/512 thru 31/512 |
| 2 | <<8 | −32/256 thru 31/256 |
| 3 | <<8 | −32/256 thru 31/256 |
| 4 | <<9 | −32/512 thru 31/512 |
| 5 | <<9 | −32/512 thru 31/512 |

In this example, DDFEs have targets which are 5 taps in length. In various embodiments, various numbers of taps are used for FIR pre-filters 502a-502c and/or DDFEs 504a-504c. Increasing the number of taps increases the performance but requires more logic or hardware.

In some embodiments, time indices for one portion of system 500 do not exactly match time indices associated with another portion. For example, suppose system 500 is implemented on a 4T clock. The four samples passed to FIR pre-filters 502a-502c are (sample$_{k-3}$, sample$_{k-2}$, sample$_{k-1}$, sample$_k$). Because of the delay associated with each DDFE, each of DDFEs 504a-504c output (decision$_{k-9}$, decision$_{k-8}$, decision$_{k-7}$, decision$_{k-6}$) along with an associated error (e.g., each DDFE may compute an error over an 8T window). In order to ensure that the samples passed from sampler 202 to TEDs 302a-302c match the decisions output by DDFEs 504a-504c, the samples output by sampler 202 are delayed by eight samples (i.e., units of T) before being passed to TEDs 302a-302c. TEDs 302a-302c have a delay of 2 samples and have outputs with indices of (k−11, k−10, k−9, k−8). In this example, the error values output by DDFEs 504a-504c correspond to indices (k−9, k−8, k−7, k−6, k−5, k−4, k−3, k−2) and are therefore off by a few indices compared to the output of TEDs 302a-302c. Since errors are accumulated in a lossy manner in this embodiment, this mismatch of indexes is acceptable since it does not affect performance. In some embodiments, an appropriate amount of delay is inserted so that the indices of the outputs of the TEDs match that of the DDFEs.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for processing a set of one or more samples, comprising:
  receiving a set of one or more samples;
  using a first signal processor associated with a first phase offset to generate a first decision and a first error value using the set of samples;
  using a second signal processor associated with a second phase offset to generate a second decision and a second error value using the set of samples, including by:
    interpolating the set of samples to obtain a set of interpolated samples at the second phase offset; and
    generating the second decision and the second error value using the set of interpolated samples at the second phase offset; and
  making a selection associated with the first decision and the second decision based at least in part on the first error value and the second error value.

2. The method recited in claim 1, wherein the first phase offset is 0.

3. The method recited in claim 1 further comprising using a third signal processor associated with a third phase offset to generate a third decision and a third error value using the set of samples, including by:
  interpolating the set of samples to obtain a set of interpolated samples at the third phase offset; and
  generating the third decision and the third error value using the set of interpolated samples at the third phase offset.

4. The method recited in claim 3, wherein the second phase offset and the third phase offset have a same magnitude and opposite signs.

5. The method recited in claim 1, wherein the second signal processor includes a finite impulse response (FIR) filter configured to obtain the set of interpolated samples at the second phase offset.

6. The method recited in claim 1, wherein the second signal processor includes one or more of the following: a Dual Decision Feedback Equalizer (DDFE) or a Viterbi detector.

7. The method recited in claim 1, wherein making the selection includes selecting from a set of decisions which includes the first decision and the second decision based at least in part on the first error value and the second error value.

8. The method recited in claim 1, wherein making the selection includes selecting a plurality of consecutive decisions.

9. The method recited in claim 1 further comprising:
generating a first timing error gradient based at least in part on the first decision; and
generating a second timing error gradient based at least in part on the second decision, wherein making the selection includes selecting from a set of timing error gradients which includes the first timing error gradient and the second timing error gradient based at least in part on the first error value and the second error value.

10. The method recited in claim 1, wherein making a selection includes making a selection which corresponds to a lowest error value.

11. A system for processing a set of one or more samples, comprising:
an interface configured to receive a set of one or more samples;
a first signal processor, associated with a first phase offset, which is configured to generate a first decision and a first error value using the set of samples;
a second signal processor, associated with a second phase offset, which is configured to generate a second decision and a second error value using the set of samples, including by:
interpolating the set of samples to obtain a set of interpolated samples at the second phase offset; and
generating the second decision and the second error value using the set of interpolated samples at the second phase offset; and
a multiplexer configured to make a selection associated with the first decision and the second decision based at least in part on the first error value and the second error value.

12. The system recited in claim 11, wherein the first phase offset is 0.

13. The system recited in claim 11 further comprising a third signal processor, associated with a third phase offset, which is configured to generate a third decision and a third error value using the set of samples, including by:
interpolating the set of samples to obtain a set of interpolated samples at the third phase offset; and
generating the third decision and the third error value using the set of interpolated samples at the third phase offset.

14. The system recited in claim 13, wherein the second phase offset and the third phase offset have a same magnitude and opposite signs.

15. The system recited in claim 11, wherein the second signal processor includes a finite impulse response (FIR) filter configured to obtain the set of interpolated samples at the second phase offset.

16. The system recited in claim 11, wherein the second signal processor includes one or more of the following: a Dual Decision Feedback Equalizer (DDFE) or a Viterbi detector.

17. The system recited in claim 11, wherein the multiplexer is configured to make the selection by selecting from a set of decisions which includes the first decision and the second decision based at least in part on the first error value and the second error value.

18. The system recited in claim 11, wherein the multiplexer is configured to make the selection by selecting a plurality of consecutive decisions.

19. The system recited in claim 11 further comprising:
a first timing error detector (TED) configured to generate a first timing error gradient based at least in part on the first decision; and
a second TED configured to generate a second timing error gradient based at least in part on the second decision, wherein the multiplexer is configured to make the selection by selecting from a set of timing error gradients which includes the first timing error gradient and the second timing error gradient based at least in part on the first error value and the second error value.

20. The system recited in claim 11, wherein the multiplexer is configured to make a selection by making a selection which corresponds to a lowest error value.

21. A computer program product for processing a set of one or more samples, the computer program product being embodied in a tangible, non-transitory computer readable storage medium and comprising computer instructions for:
receiving a set of one or more samples;
using a first signal processor associated with a first phase offset to generate a first decision and a first error value using the set of samples;
using a second signal processor associated with a second phase offset to generate a second decision and a second error value using the set of samples, including by:
interpolating the set of samples to obtain a set of interpolated samples at the second phase offset; and
generating the second decision and the second error value using the set of interpolated samples at the second phase offset; and
making a selection associated with the first decision and the second decision based at least in part on the first error value and the second error value.

* * * * *